(12) United States Patent
Anzai et al.

(10) Patent No.: US 6,361,585 B1
(45) Date of Patent: Mar. 26, 2002

(54) ROTOR-TYPE DEHUMIDIFIER, STARTING METHOD FOR ROTOR-TYPE DEHUMIDIFIER AND AN ELECTRONIC DEVICE MOUNTING THE ROTOR-TYPE DEHUMIDIFIER

(75) Inventors: Hisao Anzai; Akihiko Fujisaki, both of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/590,263

(22) Filed: Jun. 9, 2000

(30) Foreign Application Priority Data

Sep. 6, 1999 (JP) ............................................ 11-252169

(51) Int. Cl.$^7$ .............................................. B01D 53/06
(52) U.S. Cl. ............................ 95/113; 95/122; 96/125; 96/130; 96/143; 96/150
(58) Field of Search .................... 95/107, 113, 117–126; 96/122, 123, 125, 130, 143, 150

(56) References Cited

U.S. PATENT DOCUMENTS

| | | | |
|---|---|---|---|
| 3,490,201 A | * | 1/1970 | Colvin et al. .................. 95/113 |
| 4,062,129 A | * | 12/1977 | Yoshida et al. ............... 96/123 |
| 4,134,743 A | * | 1/1979 | Marcriss et al. .............. 95/113 |
| 4,228,847 A | * | 10/1980 | Lindahl ..................... 96/150 X |
| 4,235,608 A | * | 11/1980 | Watanabe et al. ......... 96/123 X |
| 4,365,979 A | * | 12/1982 | Takeyama et al. ............ 96/123 |
| 4,452,612 A | * | 6/1984 | Mattia ....................... 95/113 X |
| 4,701,189 A | * | 10/1987 | Oliker ......................... 95/113 |
| 4,769,053 A | * | 9/1988 | Fischer, Jr. ................... 96/125 |
| 5,188,645 A | * | 2/1993 | Fukuhori et al. ............. 95/113 |
| 5,238,052 A | * | 8/1993 | Chagnot .................... 96/125 X |
| 5,512,083 A | * | 4/1996 | Dunne ......................... 95/113 |
| 5,878,590 A | * | 3/1999 | Kadle et al. ............... 95/113 X |
| 6,004,384 A | * | 12/1999 | Caudle ..................... 96/150 X |
| 6,165,254 A | * | 12/2000 | Kawakami et al. ........... 96/125 |

FOREIGN PATENT DOCUMENTS

| | | | | | |
|---|---|---|---|---|---|
| GB | 2165465 A | * | 4/1986 | .................. | 96/150 |
| JP | 53-025958 | * | 3/1978 | .................. | 96/150 |
| JP | 63-051919 | * | 3/1988 | .................. | 96/125 |
| JP | 01-099630 | * | 4/1989 | .................. | 95/113 |
| JP | 1-236699 | | 9/1989 | | |
| JP | 1-318295 | | 12/1989 | | |
| JP | 3-252199 | | 11/1991 | | |
| JP | 4-320399 | | 11/1992 | | |
| JP | 06-233914 | * | 8/1994 | .................. | 96/125 |

* cited by examiner

*Primary Examiner*—Robert H. Spitzer
(74) *Attorney, Agent, or Firm*—Armstrong, Westerman & Hattori, LLP

(57) ABSTRACT

A dehumidifier includes a circular rotor accommodating a humidity absorbing material, a disc member provided on each one of two circular end surfaces of the rotor and having a diameter identical to or greater than a diameter of the rotor, and a plurality of openings formed in the disc members, wherein the rotor rotates through a dehumidification zone and a recycle zone formed by a dividing plate disposed so as to project from each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material. The openings in the disc members have an identical substantially fan shape and are disposed so as to radiate from a center of the disc member, thus exposing the humidity absorbing material accommodated therein. The dehumidifier further includes a strip member made of a flexible material disposed between the dividing plate and the disc member so as to form a seal between the dehumidification zone and the recycle zone, preventing leakage of air from one zone into the other and thus improving dehumidification.

12 Claims, 7 Drawing Sheets

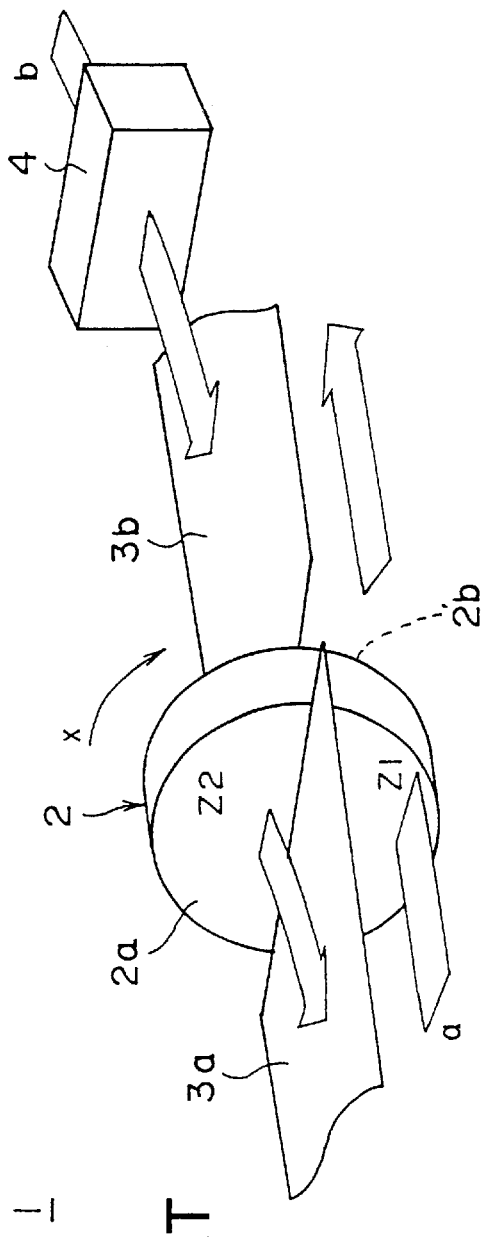
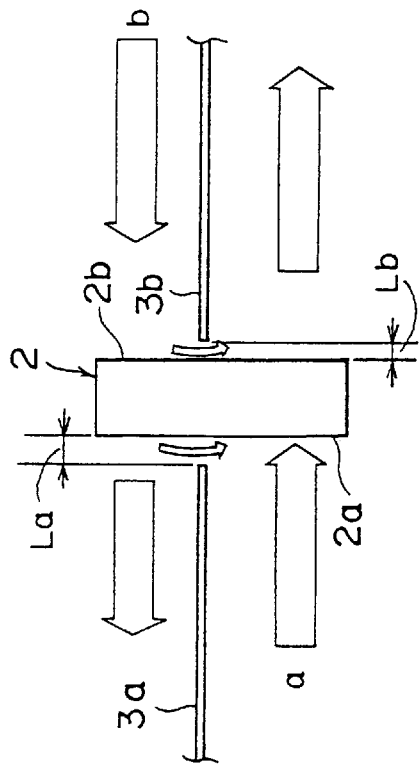
FIG.1A PRIOR ART
FIG.1B PRIOR ART

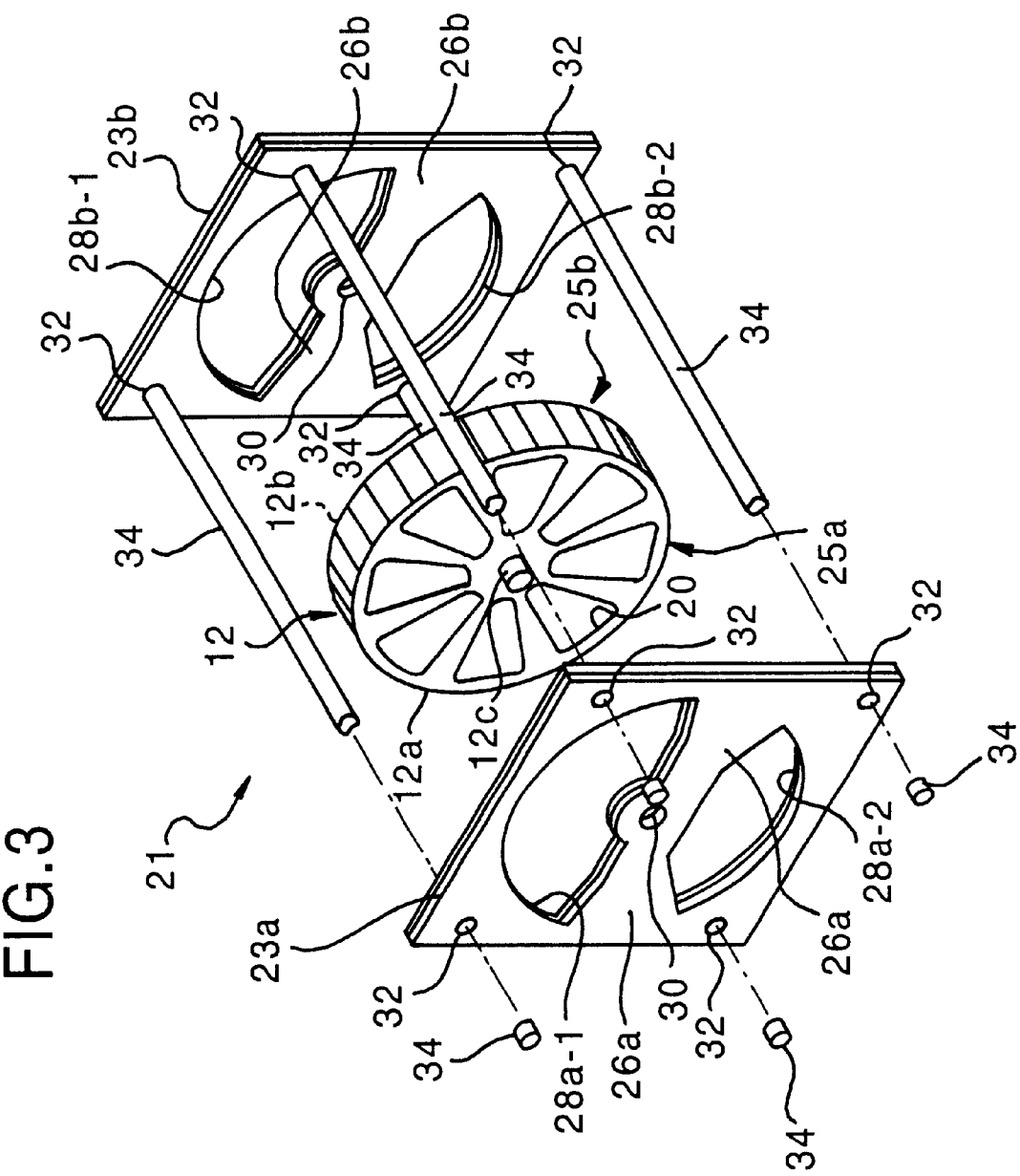

ROTOR-TYPE DEHUMIDIFIER, STARTING METHOD FOR ROTOR-TYPE DEHUMIDIFIER AND AN ELECTRONIC DEVICE MOUNTING THE ROTOR-TYPE DEHUMIDIFIER

BACKGROUND OF THE INVENTION

1. Field of the Invention

The present invention relates generally to a rotor-type dehumidifier, starting method for rotor-type dehumidifier and an electronic device mounting the rotor-type dehumidifier.

2. Description of the Related Art

Moisture in the air causes metallic materials to rust and is a factor in degrading the quality of industrial products, so some degree of dehumidification is common. Moreover, in order for the semiconductor elements used in supercomputers to operate stably at the high integration densities and exceptionally high speeds required, these semiconductors must be cooled, typically by a cooling system using a cooling device, which causes condensation which must be removed.

A variety of types are used for the dehumidifiers of the kind described above, among them a rotor-type dehumidifier.

FIGS. 1A and 1B are diagrams showing perspective and side views, respectively, of a conventional rotor-type dehumidifier. As shown in FIGS. 1A and 1B, the conventional rotor-type dehumidifier 1 for example has a disk-shaped rotor 2, two circular end surfaces 2a, 2b, dividing blades 3a, 3b protruding from the circular end surfaces 2a, 2b so as to divide the area into a dehumidification zone Z1 and a recycle zone Z2, through which zones the rotor rotates. A humid body such as the processing medium a is passed through the dehumidification zone Z1 and dehumidified and reproduced, while a relatively low-humidity air (the reproducing medium) b is passed through the recycle zone Z2.

The rotor 2 is made for example from a porous, moisture-absorbing material such as silica gel, and is rotatably urged by a drive member not shown in the diagram at a constant speed in a direction represented in FIG. 1 by arrow X.

The dehumidified and dried air a is then exhausted from the rotor-type dehumidifier 1 and injected into a device to be dehumidified and the device dehumidified. The now moisture-laden air a is circulated and reinjected into the rotor-type dehumidifier 1, where it is sent to the dehumidification zone Z1. The rotation of the rotor 2 introduces into the dehumidification zone Z1 the dried silica gel that has been heated and dried and the moisture content removed therefrom in the recycle zone 2, the air a then contacts the dried silica gel and the moisture content of the air a is absorbed. As a result, the air is dehumidified and reproduced and recycled to the device to be dehumidified.

At the same time, air b is heated by a heater 4 and sent to the recycle zone Z2 of the rotor 2 in a state of relatively low-humidity. The rotation of the rotor 2 introduces into the recycle zone Z2 the moisture-absorbing silica gel that has absorbed moisture content in the dehumidification zone Z1, such that the air b dries the moisture-absorbing silica gel and removes the moisture therefrom. As a result, the dried silica gel is further rotated by the rotor 2 and once again sent to the dehumidification zone Z1, while the moisture-laden humid air b is exhausted to the exterior of the apparatus.

However, if in the rotor-type dehumidifier 1 having the structure described above there is a gap La, Lb between the blades 3a, 3b that divide the circular end surfaces 2a, 2b of the rotor 2, on the one hand, and the circular end surfaces 2a, 2b themselves on the other, as shown for example in FIG. 1B, then air leaks from a side of high pressure to a side of low pressure. As a result of this leakage, which in FIG. 1B is from the air b side to the air a side, the dehumidifying power of the apparatus declines and can degrade the electronic device it was meant to protect.

A variety of expedients are used to circumvent this disadvantage, such as minimizing the gap between the rotor and attaching a rubber skirt to the blades so that the rubber skirt slides along the circular end surfaces of the rotor.

However, none of these conventional expedients suffices to create an adequate seal.

It is conceivable, for example, to attach a flexible member to the blade in such a way that the flexible member presses against the rotor. However, in order to perform adequately the rotor requires a large surface area, and accordingly, a porous and therefore fragile material is used for the rotor, as a result of which the rotor is easily damaged if pressed with force. Additionally, heavy pressure on the rotor means a heavier load on the rotational drive force needed to rotate the rotor.

SUMMARY OF THE INVENTION

Accordingly, it is a general object of the present invention to provide an improved and useful rotor-type dehumidifier in which the above-described disadvantages are eliminated.

Another, further and more specific object of the present invention is to provide a rotor-type dehumidifier having an adequate seal between the blades and the rotor.

Another object of the present invention is to provide an optimal starting method for a rotor-type dehumidifier Still another object of the present invention is to provide an improved and useful structure for mounting a rotor-type dehumidifier on an electronic device.

The above-described objects of the present invention are achieved by a dehumidifier comprising:

a circular rotor accommodating a humidity absorbing material;

a disc member provided on each one of two circular end surfaces of the rotor and having a diameter identical to or greater than a diameter of the rotor; and a plurality of openings formed in the disc members, wherein the rotor rotates through a dehumidification zone and a recycle zone formed by a dividing plate disposed slidingly contacting each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material.

The above-described objects of the present invention are also achieved by the dehumidifier as described above, wherein the openings in each one of the disc member have an identical substantially fan shape and are disposed so as to radiate from a center of the disc member.

According to the invention described above, the solid portions between the openings in the disc member and the dividing plates are in sliding contact with each other and thus form a seal therebetween, preventing the leakage of air. Additionally, the rotor is protected by the disc member and does not directly contact the dividing plates, so the rotor suffers no damage therefrom.

The above-described objects of the present invention are also achieved by the dehumidifier as described above, further comprising a strip of flexible material between the dividing plate and the disc member.

According to the invention described above, the solid portions between the openings in the disc member and the dividing plates are in sliding contact with each other and thus form a seal therebetween, preventing the leakage of air. Additionally, the rotor is protected by the disc member and does not directly contact the dividing plates, so the rotor suffers no damage therefrom.

The above-described objects of the present invention are also achieved by a method for starting a dehumidifier, the dehumidifier comprising:

a circular rotor accommodating a humidity absorbing material;

a disc member provided on each one of two circular end surfaces of the rotor and having a diameter identical to or greater than a diameter of the rotor; and a plurality of openings formed in the disc members, wherein the rotor rotates through a dehumidification zone and a recycle zone formed by a dividing plate slidingly contacting each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material, the method comprising the steps of:

commencing a rotation of the rotor and commencing a circulation of the second flow of air at the same time, and after a predetermined period of time commencing a circulation of the first flow of air.

According to the invention described above, even though the rotor has acquired humidity when the rotor-type dehumidifier has not been in use and is therefore unsuitable for immediate use as a dehumidifier, the air actually used to dehumidify the object is not circulated via the rotor until the rotor has first been thoroughly dehumidified.

The above-described objects of the present invention are also achieved by an electronic device mounting a dehumidifier, the dehumidifier comprising:

An electronic device mounting a dehumidifier, the dehumidifier comprising:

a circular rotor accommodating a humidity absorbing material;

a disc member provided on each one of two circular end surfaces of the rotor and having a diameter identical to or greater than a diameter of the rotor; and a plurality of openings formed in the disc members, wherein the rotor rotates through a dehumidification zone and a recycle zone formed by a dividing plate slidingly contacting each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material, the electronic device being enclosed in a housing, at least two openings being formed in a side of the housing and communicating with the dehumidifier, one of the openings communicating with the dehumidification zone on one side of the rotor and the other opening communicating with the dehumidification zone on an opposite side of the rotor so as to facilitate a flow of air from the first opening to the second opening.

According to the invention described above, the rotor-type dehumidifier according to the present invention can be connected directly to the electronic device without the intervention of pipes or tubes, thus improving the efficiency with which dehumidification is performed and permitting the joint rotor-type dehumidifier/electronic device assembly to be made more compact.

Other objects, features and advantages of the present invention will become more apparent from the following detailed description when read in conjunction with the accompanying drawings.

BRIEF DESCRIPTION OF THE DRAWINGS

FIGS. 1A and 1B are diagrams showing perspective and side views, respectively, of a conventional rotor-type dehumidifier;

FIG. 3 is a diagram showing an expanded perspective view of a rotor-type dehumidifier according to a second embodiment of the present invention;

DESCRIPTION OF THE PREFERRED EMBODIMENTS

A description will now be given of embodiments of the present invention, with reference to the accompanying drawings. It should be noted that identical or corresponding elements in the embodiments are given identical or corresponding reference numbers in all drawings and detailed descriptions thereof are omitted.

Figure 2A:
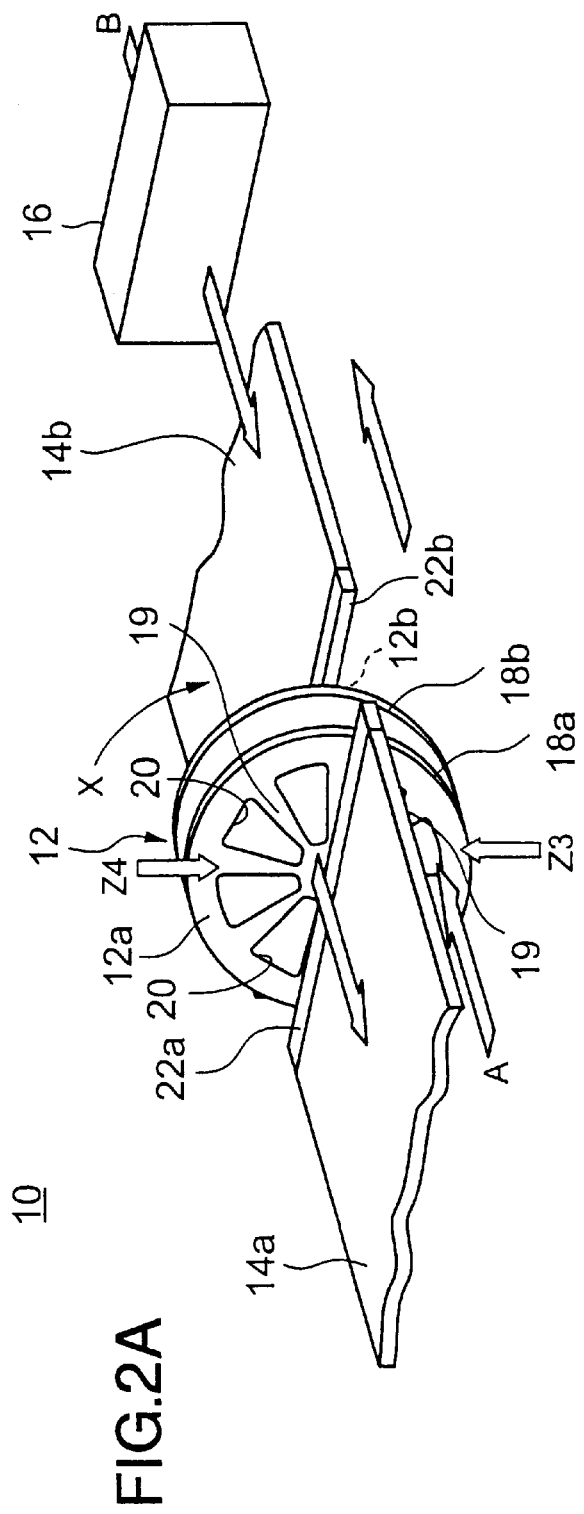
FIGS. 2A and 2B are diagrams showing perspective and side views, respectively, of major components of a rotor-type dehumidifier according to a first embodiment of the present invention.
Figure 2B:
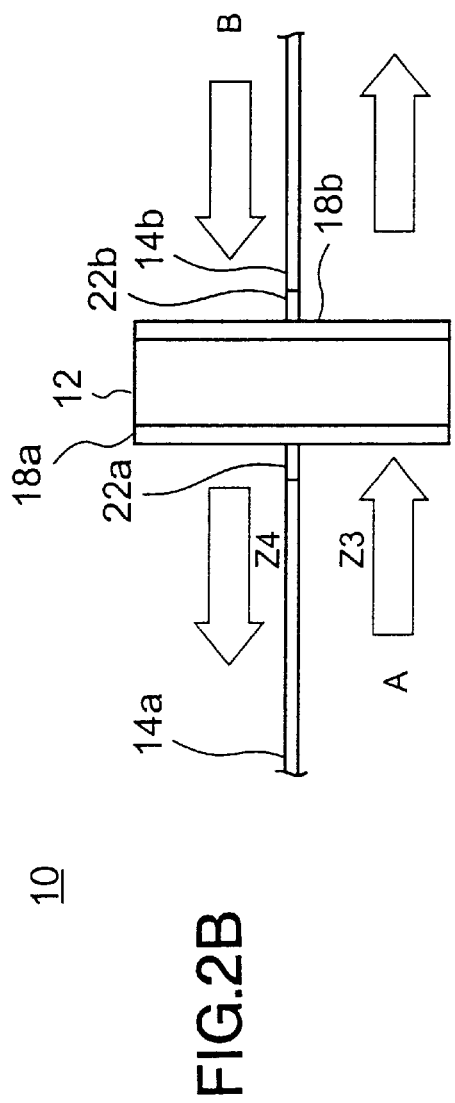

FIGS. 2A and 2B are diagrams showing perspective and side views, respectively, of major components of a rotor-type dehumidifier according to a first embodiment of the present invention.

As shown in the diagram, the rotor-type dehumidifier 10 has a rotor 12 and dividing plates 14a, 14b that divide both the rotor 12 as well as a passageway through which air flows into a dehumidification zone Z3 and a recycle zone Z4.

In the dehumidification zone Z3, air A used for dehumidification is circulated from the center left side of the diagram to the right side of the diagram between objects to be dehumidified not shown in the diagram. In the recycle zone Z4, air B passes through from the right side to the left side, drying and preparing the rotor 12 for reuse.

The rotor 12 is substantially a foreshortened cylinder in shape, and is made for example from a porous, moisture-absorbent material such as silica gel. The greater the surface area of the rotor the better the moisture absorption, and moreover, and the smaller the air resistance the smaller the amount of motive power lost. For these reasons the rotor is made of a soft, spongy material. The two end surfaces 12a, 12b of the rotor 12 are in this embodiment divided by the dividing plates 14a, 14b into equal hemispheres corresponding to the above-described dehumidification zone Z3 and recycle zone Z4. It should be noted, however, that the two zones are not necessarily equally proportioned but are adjusted according to the quality of the air and the ease or difficulty with which dehumidification of the object can be carried out.

Additionally, one end of a belt not shown in the diagram is wound around the periphery of the rotor 12, with the other end of the belt being wound around a drive member not shown in the diagram, such that when the drive member is urged the rotor 12 rotates for example in a direction indicated in the diagram by arrow X.

The rotor 12 as well as the dividing plates 14a, 14b are for example contained within a box-like housing, which, for ease of explanation, is not shown in the diagram. Accordingly, the passage through which the flow of air passes is divided into two completely separated zones described above, the dehumidification zone Z3 and the recycle zone Z4. The housing is further provided with separate entrances and exits for the dehumidification air A and the recycle air B.

Additionally, to the circular end surfaces 12a, 12b of the rotor 12 are attached disc members 18a, 18b having diameters identical to the diameter of the rotor 12, the disc members 18a, 18b being affixed to the circular end surfaces 12a, 12b of the rotor 12 by a silicon sealant or the like. A plurality of substantially fan-shaped openings 20 are provided on the disc members 18a, 18b so as to radiate from a center point of the disc members 18a, 18b. The disc members 18a, 18b are made of a low-friction material such as polytetrafluoroethylene.

Additionally, strip members 22a, 22b are affixed for example by an adhesive agent to edge members of the dividing plates 14a, 14b disposed opposite the circular end surfaces 12a, 12b of the rotor 12. The strip members 22a, 22b are made of a flexible material such as silicon foam rubber, for example. When the rotor 12 turns, the strip members 22a, 22b slidingly contact solid portions 19 between adjacent openings 20 in the disc members 18a, 18b, so that the disc members 18a, 18b and the strip members 22a, 22b together form a seal mechanism, that is, forming a seal between the rotor 12 and the dividing plates 14a, 14b.

The air A that has been used to dehumidify the object to be dehumidified and is thus laden with moisture absorbed therefrom is circulated through the rotor-type dehumidifier 10 by a fan not shown in the diagram and sent to the dehumidification zone Z3. The rotation of the rotor 12 brings to the dehumidification zone Z3 that portion of the rotor 12 (which, it will be recalled, is composed of a moisture-absorbing material such as silica gel) that has been dried and readied for reuse in the recycle zone Z4. The moisture in the air A is absorbed by this dried portion of the rotor 12 as the rotor 12 passes through the dehumidification zone Z3, thus drying the air A and preparing it for reuse. The thus-dried air A is then recirculated to the object to be dehumidified. At the same time, the recycle air B is heated by a heater 16 and introduced into and passed through the recycle zone Z4 in a state of relatively low humidity.

At this time, the rotation of the rotor 12 brings the rotor 12 into the recycle zone Z4 and with it that portion of the silica gel of the rotor 12 that absorbed moisture in the dehumidification zone Z3, where this silica gel portion of the rotor 12 is dried as the recycle air B passes through. A further rotation of the rotor 12 brings this dried silica gel portion once again into the dehumidification zone Z3. At the same time, the recycle air B that has absorbed moisture is exhausted to the exterior of the housing of the rotor-type dehumidifier 10 by a fan not shown in the diagram.

According to the rotor-type dehumidifier 10 according to the above-described first embodiment of the present invention, by slidingly contacting the disc members 18a, 18b and the strip members 22a, 22b with each other the joint or space between the rotor 12 and the dividing plates 14a, 14b is sealed, so no air leaks from one zone into the other.

Additionally, the rotor 12 is protected by the disc members 18a, 18b and thus does not directly contact the dividing plates 14a, 14b, so the rotor suffers no damage from the dividing plates 14a, 14b.

Figure 4:
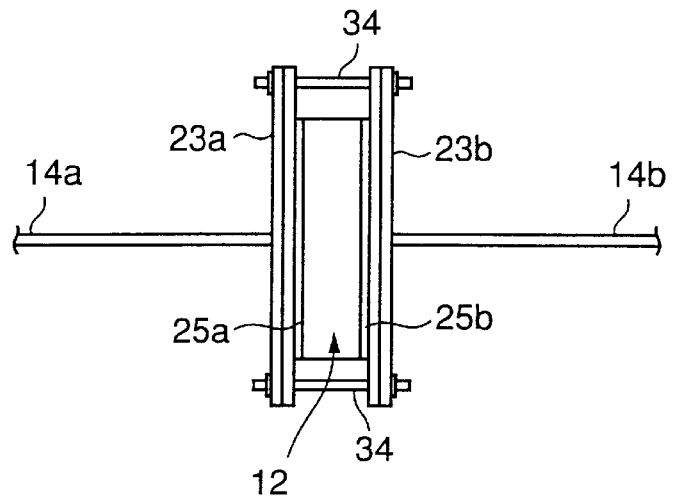
FIG. 4 is a diagram showing a schematic side view of a rotor-type dehumidifier according to a second embodiment of the present invention.

A description will now be given of a rotor-type dehumidifier according to a second embodiment of the present invention, with reference to FIGS. 3, 4 and 5.

FIG. 3 is a diagram showing an expanded perspective view of a rotor-type dehumidifier 21 according to a second embodiment of the present invention. FIG. 4 is a diagram showing a schematic side view of a rotor-type dehumidifier 21 according to a second embodiment of the present invention. FIG. 5 is a diagram showing a stacked view of a plate member and a disc member for the purpose of explaining a seal member of a rotor-type dehumidifier 21 according to a second embodiment of the present invention.

It should be noted that the rotor-type dehumidifier 21 according to the second embodiment of the present invention is substantially identical to the rotor-type dehumidifier 10 according to the first embodiment of the present invention described above, so a detailed description of the former shall be omitted.

As with the first embodiment, in the rotor-type dehumidifier 21 according to a second embodiment of the present invention disc members 25a, 25b having a plurality of fan-shaped openings 20 are affixed to circular end surfaces 12a, 12b of the rotor 12. Additionally, substantially rectangular plates 23a, 23b are provided at edge members of the dividing plates 14a, 14b disposed opposite the rotor 12. The substantially rectangular plates 23a, 23b have a three-ply construction, comprising a flexible outer member made of glass cross silicone, an inner member made of a low-friction material such as polytetrafluoroethylene, and an intermediate layer made of a flexible material such as silicone sponge. Additionally, a hole 30 for a bearing supporting a shaft 12c of the rotor 12 is formed in a center of the substantially rectangular plates 23a, 23b. Additionally, two openings are formed in each of substantially rectangular plates 23a, 32b generally corresponding to the plurality of openings 20 formed in the disc members 25a, 25b. These openings 28a-1, 28a-2, 28b-1 and 28b-2 are formed above and below generally fan-shaped solid portions 26a, 26b located at the centers of the respective substantially rectangular plates 23a, 23b. Additionally, holes 32 are formed in the four corners of the substantially rectangular plates 23a, 23b for the purpose of passing therethrough a linking member 34, in a state in which the rotor 12, itself supported by the shaft 12c that is in turn supported by the hole 30, is sandwiched between the substantially rectangular plates 23a, 23b, with the whole forming a single integrated assembly.

Figure 5:
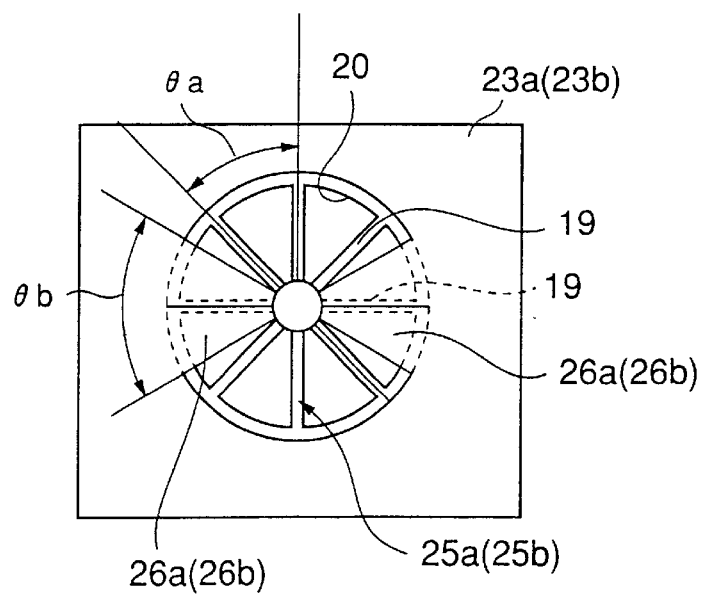
FIG. 5 is a diagram showing a stacked view of a plate member and a disc member for the purpose of explaining a seal member of a rotor-type dehumidifier according to a second embodiment of the present invention.

As shown in FIG. 5, an angle θa of the interior apex of the roughly fan-shaped solid portions 26a, 26b of the substantially rectangular plates 23a, 23b is larger than a similar angle θb. Accordingly, at all rotation positions of the rotor 12, at least some of the solid portions 19 between adjacent openings 20 are always opposite solid portions 26a, 26b, so there is always a secure seal between the rotor 12 and the dividing plates 14a, 14b. It should be noted that the rotor 12 in this case is rotatably urged by a motor not shown in the diagram but coupled directly to the shaft 12c.

A description will now be given of a method for starting the rotor-type dehumidifier 10, 21 according to the above-described embodiments.

Figure 6:
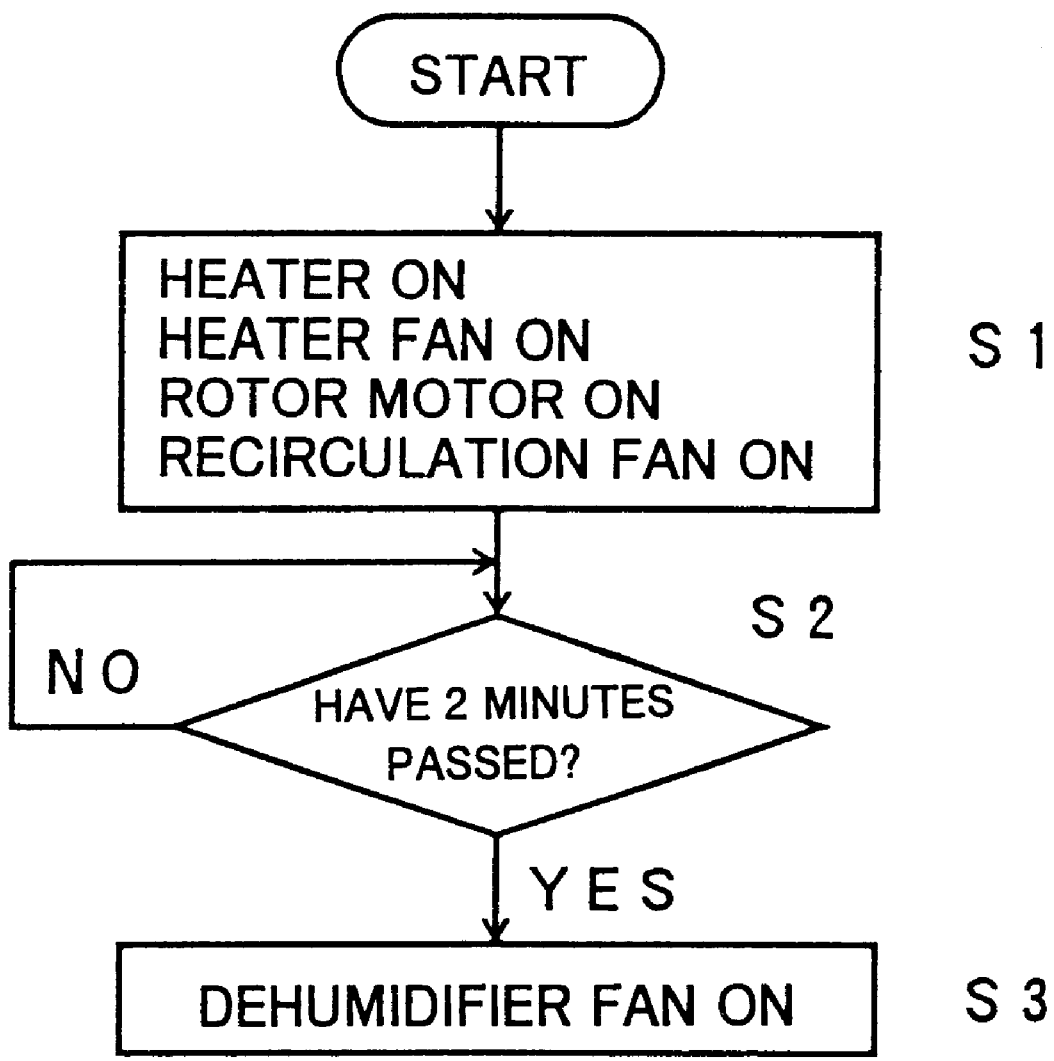
FIG. 6 is a flow chart for the purpose of explaining a starting method for a rotor-type dehumidifier.

FIG. 6 is a flow chart for the purpose of explaining a starting method for a rotor-type dehumidifier.

First, in a step S1, power is switched on to a drive member, that is, a motor, of the rotor 12 as well as to a fan on the air B side, the heater 16 and a heater fan. Then, as the rotor 12 is rotated, the recycle air B heated by the heater 16 dries all of the silica gel of the rotor 12 in the recycle zone Z4 and prepares the silica gel of the rotor 12 for use in dehumidifying a chosen object.

Next, in a step S2, after it has been determined that a predetermined period of time has passed, for example two minutes, power is turned on to a fan on the dehumidifying air A side in a step S3, sending the air A that has been dehumidified in the dehumidification zone Z3 and which is to be used for dehumidification to an object to be dehumidified.

According to the starting method described above, a rotor 12 that has absorbed moisture and hence acquired humidity while at rest is still quickly useful because dehumidification air A is sent to the rotor 12 only after the rotor 12 has been prepared for use by the recycle air B, thus ensuring that only properly dehumidified air A is supplied to the object to be dehumidified.

A description will now be given of an electronic device mounting the rotor-type dehumidifier according to either the first or second embodiments of the present invention.

Figure 7:
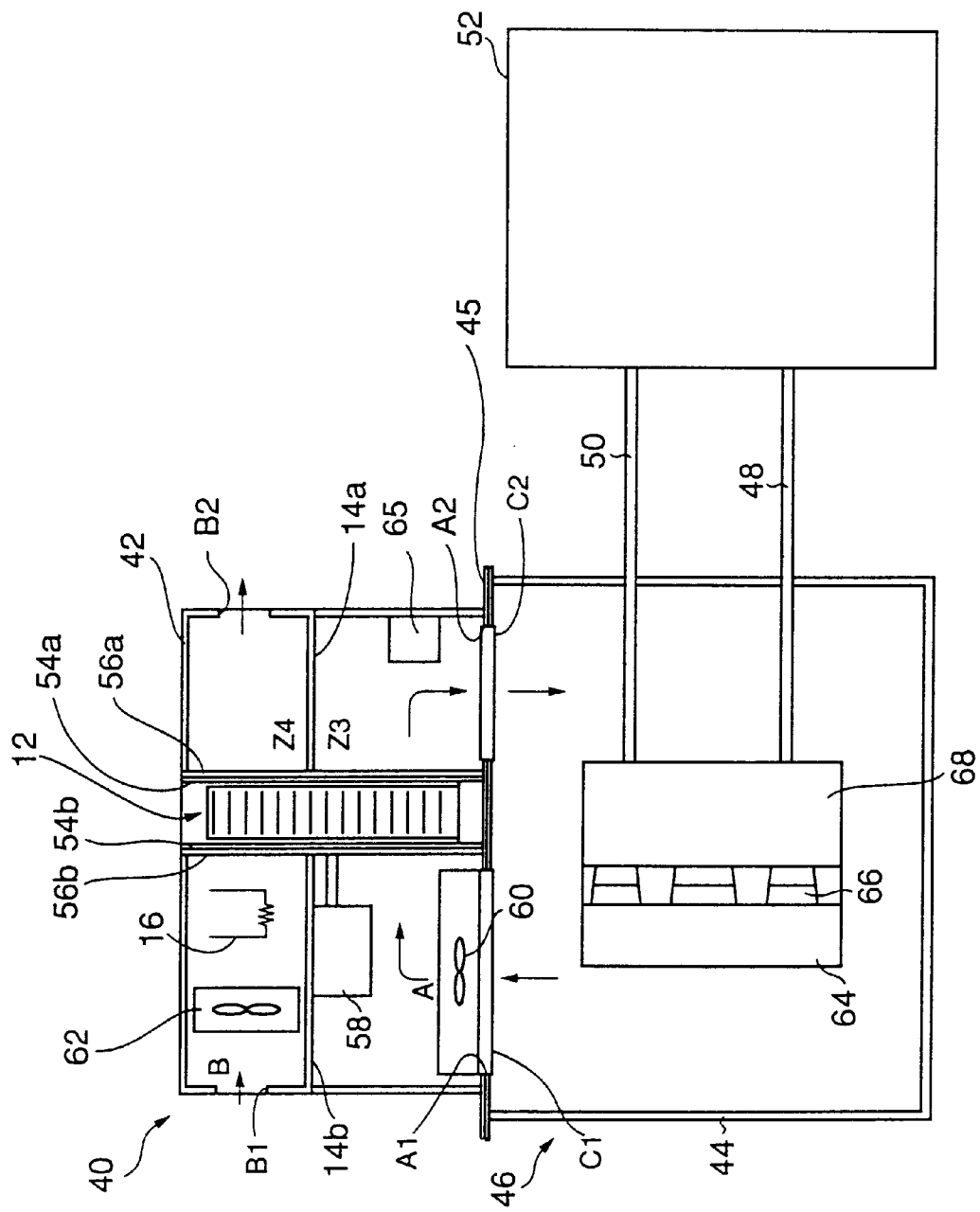
FIG. 7 is a diagram showing a schematic layout of an electronic device mounting a rotor-type dehumidifier according to the present invention.
Figure 8:
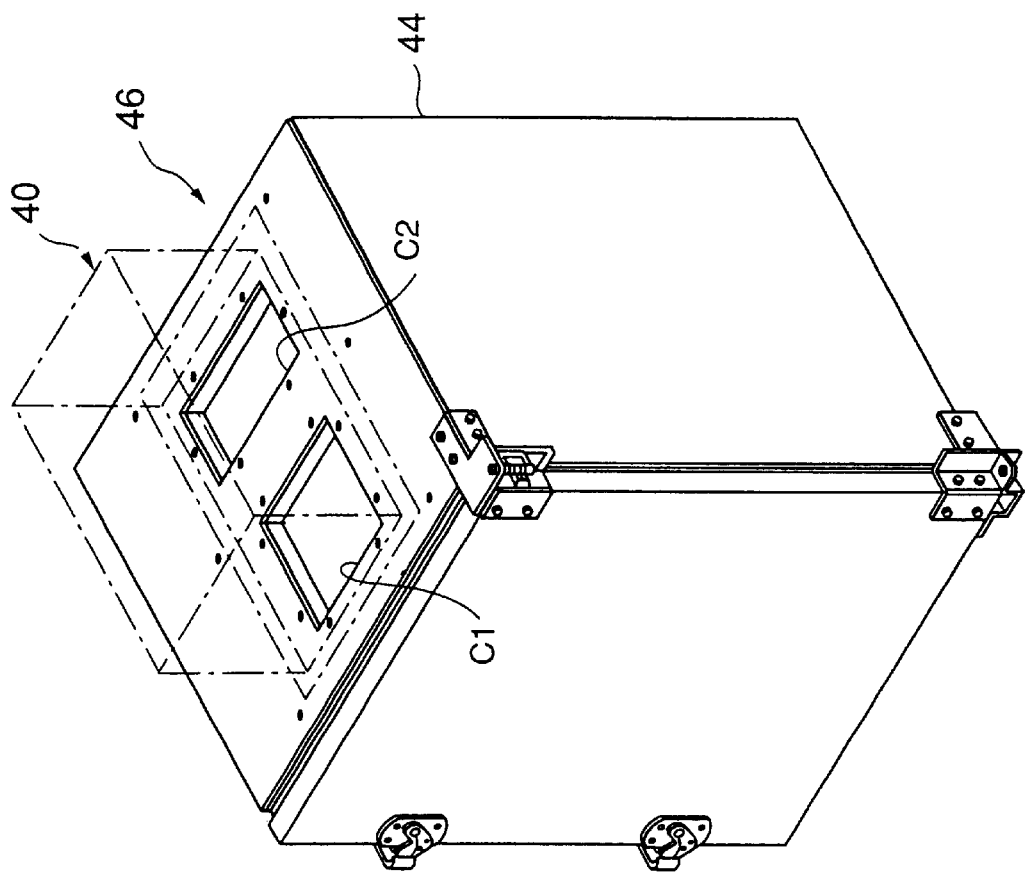
FIG. 8 is a diagram showing a schematic perspective view of an electronic device mounting the rotor-type dehumidifier according to the present invention as shown in FIG. 7.

FIG. 7 is a diagram showing a schematic layout of an electronic device mounting a rotor-type dehumidifier 40 according to the present invention. FIG. 8 is a diagram showing a schematic perspective view of an electronic device mounting the rotor-type dehumidifier according to the present invention as shown in FIG. 7.

As shown in the diagrams, the rotor-type dehumidifier 40 is enclosed in a substantially rectangular housing 42, one side of which is closely attached to a top side of a housing 44 of an electronic device 46 via a seal member 45. To another side surface of the housing 44 of the electronic device 46 a coolant supply device 52 is attached, via pipes 48, 50.

The rotor-type dehumidifier 40 is substantially similar to the rotor-type dehumidifiers 10, 21 according to the embodiments described above. That is, disc members 54a, 54b are affixed to circular end surfaces 12a, 12b of the rotor 12 and strip members 56a, 56b are provided on dividing plates 14a, 14b. In this case, the rotor 12 is coupled directly to and rotated by a motor 58. The housing 42 has openings in a lower left portion and a lower right portion of the dehumidification zone Z3, the first opening A1 being for the entry of dehumidification air A and the second opening A2 being for the exit of dehumidification air A. A fan 60 for circulating the air A and the second opening A2 being for the exit of dehumidification air A. A fan 60 for circulating the air A for dehumidification is provided on an inside of the entry A1, such that in FIG. 7 air moves from the left to the right and pushes against the rotor 12.

At the same time, openings are formed in a left edge member and a right edge member of the recycle zone Z4 of the housing 42, the left opening B1 being for the entry of recycle air B and the right opening B2 being for the exit of recycle air B. A fan 62 for recirculating the recycle air B is provided on an inside of the opening B1 and, in this case, as with the dehumidification air A, moves air from the left to the right in FIG. 7 so as to push against the rotor 12. Additionally, the heater 16 is provided between the fan and the rotor 12, so that after the recycle air B is heated and dried the recycle air B passes through the rotor 12. It should be noted that a control circuit substrate 65 for the purpose of controlling the operation of rotor-type dehumidifier 40 is provided in an interior portion of the housing 42.

The electronic device 46 is contained in the housing 44. In one side of the housing 44 are formed openings C1, C2 that communicate with entry A1 and exit A2 of the dehumidification air A. Accordingly, the housing 44 of the electronic device 46 and the housing 42 of the rotor-type dehumidifier 40 are directly coupled to each other without the intervention of pipes, tubes and the like, with the dehumidification air A circulating therethrough.

The electronic device 46 has semiconductor element 66 mounted atop a printed circuit board 64 and a cooling member contacting the semiconductor element 66. The cooling member 68 is provided so that a liquid coolant, which may be water, can circulate therethrough, with entry and exit tubes 48, 50 connected to the coolant supply device 52.

The coolant supply device 52 is cooled to a low temperature by the circulating liquid coolant.

A further description is now given of the electronic device 46 mounting the rotor-type dehumidifier of the present invention with reference to FIG. 8.

As noted previously, the rotor-type dehumidifier 40 is connected to the top of the electronic device 46 via the seal member 45, such that the exit A2 of the housing 42 is aligned with the opening C1 of the housing 44 and the entry A1 of the housing 42 is aligned with the opening C2 of the housing 44. As can be appreciated, the rotor-type dehumidifier 40 and the electronic device 46 are connected directly to each other without the intervention of pipes or tubes, so the rotor-type dehumidifier 40 can be mounted easily on the electronic device 46, thus making the entire assembly more compact.

The above description is provided in order to enable any person skilled in the art to make and use the invention and sets forth the best mode contemplated by the inventors of carrying out the invention.

The present invention is not limited to the specifically disclosed embodiments, and variations and modifications may be made without departing from the spirit and scope of the present invention.

The present application is based on Japanese Priority Application No. 11-252169, filed on Sep. 6, 1999, the entire contents of which are hereby incorporated by reference.

What is claimed is:

1. A method for starting a dehumidifier, the dehumidifier comprising:
   a circular rotor accommodating a humidity absorbing material;
   a disc member provided on each one of two circular end surfaces of the rotor and having a diameter identical to or greater than a diameter of the rotor; and a plurality of openings formed in the disc members, wherein the rotor rotates through a dehumidification zone and a recycle zone formed by a dividing plate slidingly contacting each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material, the method comprising the steps of:

commencing a rotation of the rotor and commencing a circulation of the second flow of air at the same time, and after a predetermined period of time commencing a circulation of the first flow of air.

2. A dehumidifier comprising:

a circular rotor accommodating a humidity absorbing material;

a disc member provided on each one of two circular end surfaces of the rotor and having a diameter identical to or greater than a diameter of the rotor; and a plurality of openings formed in the disc members, wherein the rotor rotates through a dehumidification zone and a recycle zone formed by a dividing plate slidingly contacting each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material.

3. The dehumidifier as claimed in claim 2, wherein the openings in each one of the disc members have an identical substantially fan shape and are disposed so as to radiate from a center of the disc member.

4. The dehumidifier as claimed in claim 3, further comprising a plate disposed between the disc member and the dividing plate, a surface of the plate disposed opposite the rotor being made of a low-friction material.

5. The dehumidifier as claimed in claim 4, wherein the plate has an upper opening and a lower opening, a solid area between the upper and lower openings forming substantially a triangle, an angle of an inner apex of the triangle being greater than an angle of an inner apex of any of the substantially fan-shaped openings in the disc member.

6. The dehumidifier as claimed in claim 4, wherein the low-friction material is polytetrafluoroethylene.

7. The dehumidifier as claimed in claim 2, further comprising a strip member made of a flexible material disposed between the dividing plate and the disc member.

8. The dehumidifier as claimed in claim 7, wherein the flexible material is silicon foam rubber.

9. The dehumidifier as claimed in claim 2, wherein at least an outer surface of the disc member is made of a low-friction material.

10. The dehumidifier as claimed in claim 9, wherein the low-friction material is polytetrafluoroethylene.

11. An electronic device mounting a dehumidifier, the dehumidifier comprising:

a circular rotor accommodating a humidity absorbing material;

a disc member provided on each one of two circular end surfaces of the rotor and having a diameter identical to or greater than a diameter of the rotor; and a plurality of openings formed in the disc members, wherein the rotor rotates through a dehumidification zone and a recycle zone formed by a dividing plate slidingly contacting each one of the disc members, the rotor circulating a first flow of air of relatively high humidity through the dehumidification zone so as to dehumidify and recycle the first flow of air, the rotor circulating a second flow of air of relatively low humidity through the recycle zone so as to dehumidify the humidity absorbing material, the electronic device being enclosed in a housing, at least two openings being formed in a side of the housing and communicating with the dehumidifier, one of the openings communicating with the dehumidification zone on one side of the rotor and the other opening communicating with the dehumidification zone on an opposite side of the rotor so as to facilitate a flow of air from the first opening to the second opening.

12. The electronic device as claimed in claim 11, the dehumidifier enclosed by a housing have at least two openings formed therein so as to communicate with the openings in the housing of the electronic device, a seal member being disposed between the housing of the dehumidifier and the housing of the electronic device so as to seal a periphery of the openings.

* * * * *